Sept. 3, 1946.  A. D. L. HUTCHINSON  2,407,012
SAFETY DEVICE FOR DUMP TRUCKS
Filed March 1, 1944  5 Sheets-Sheet 1
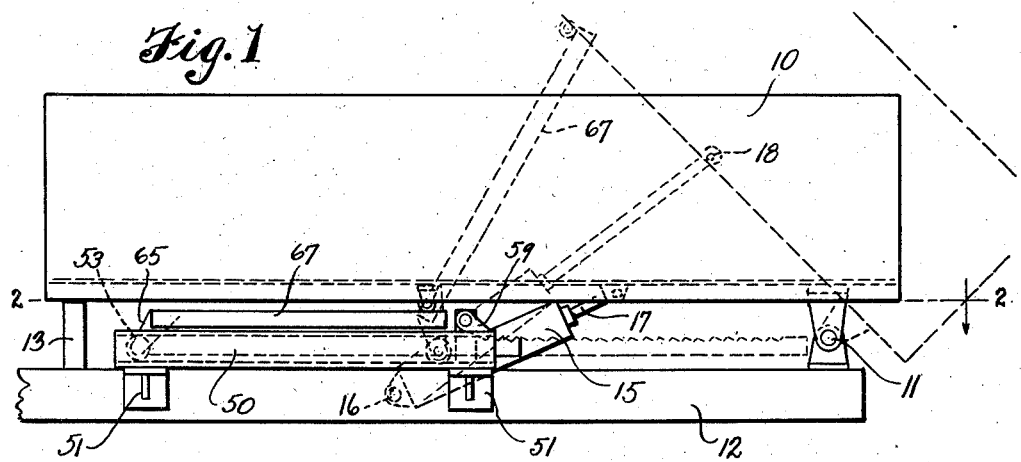
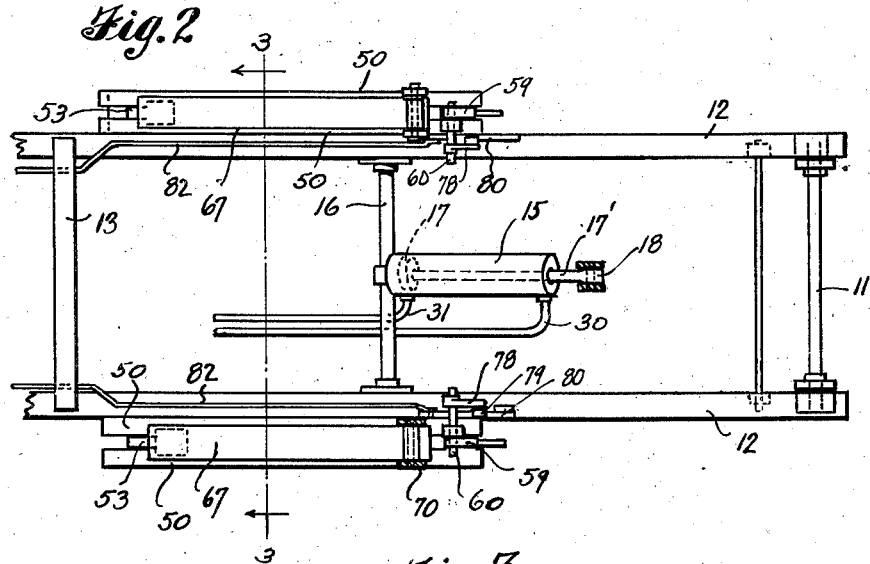
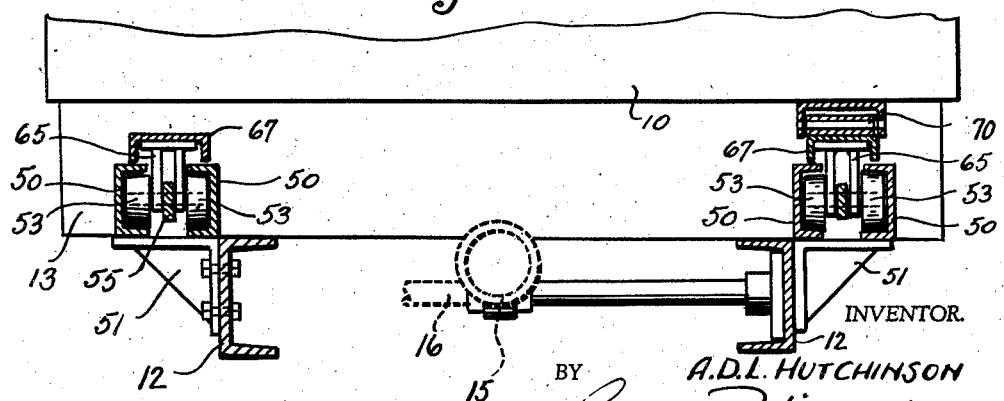
INVENTOR.
A. D. L. HUTCHINSON
BY Cook & Robinson ATTORNEYS

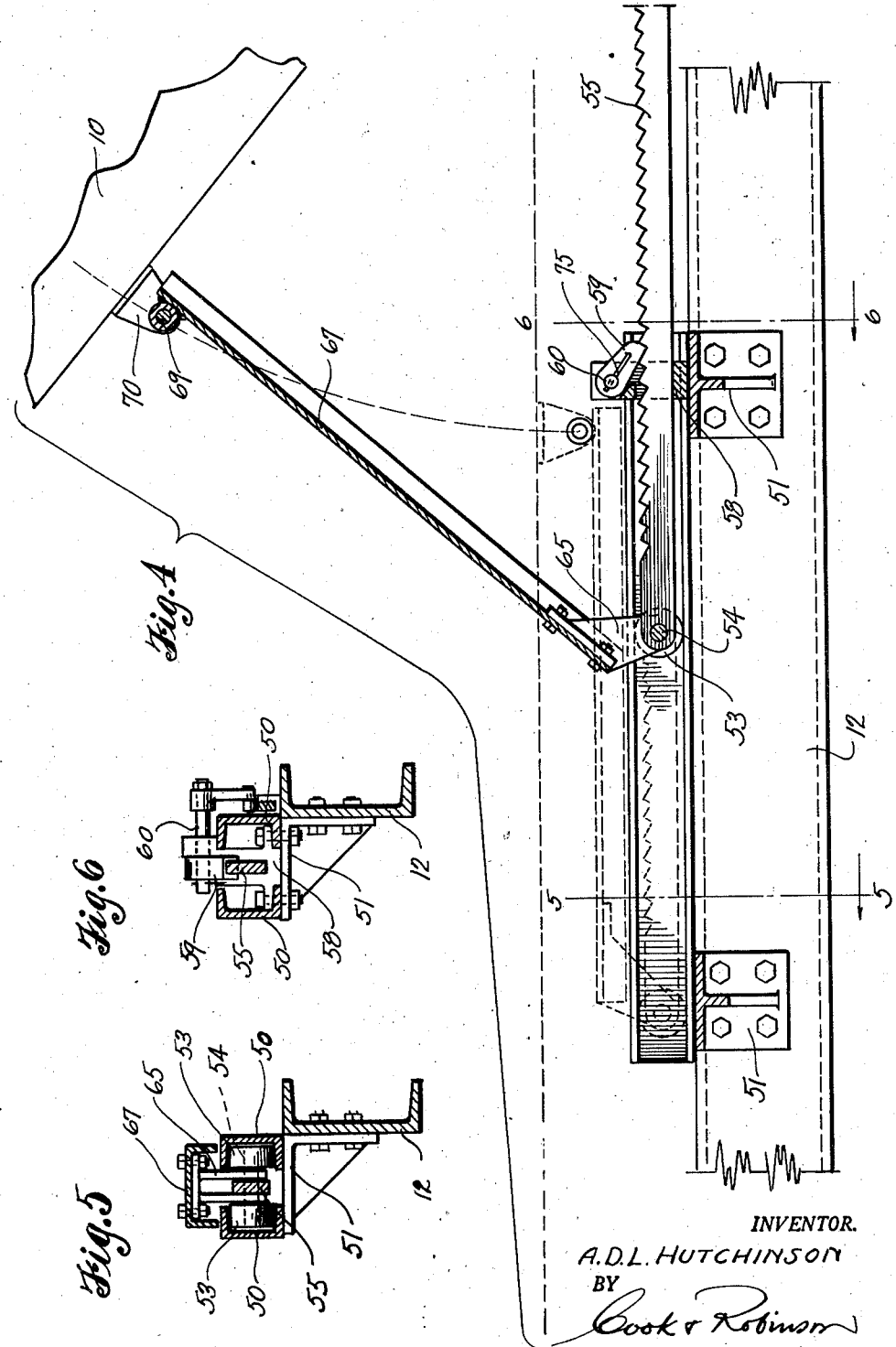

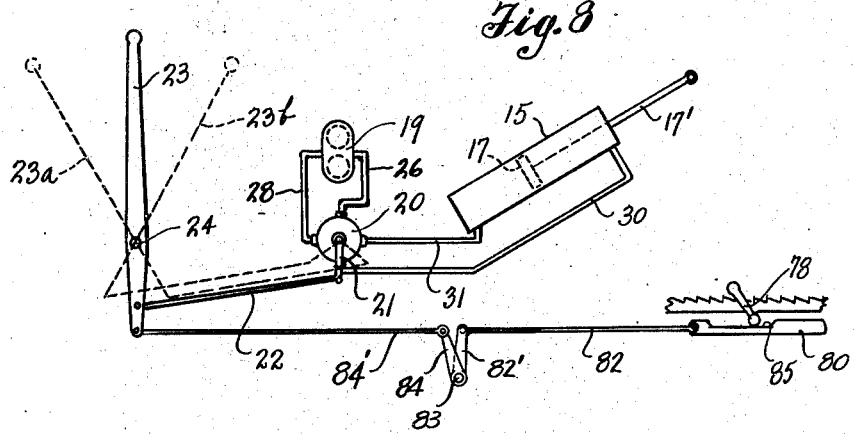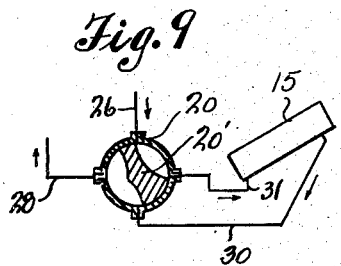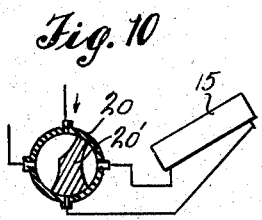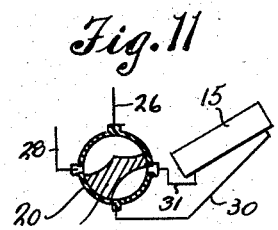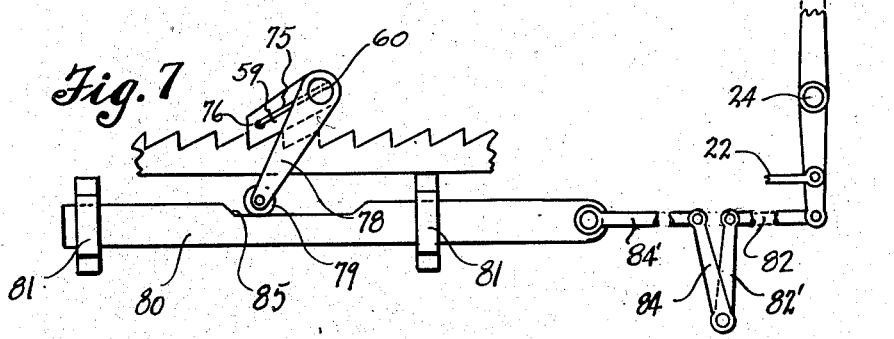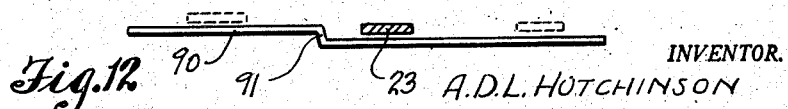

Sept. 3, 1946.　　A. D. L. HUTCHINSON　　2,407,012
SAFETY DEVICE FOR DUMP TRUCKS
Filed March 1, 1944　　5 Sheets-Sheet 4
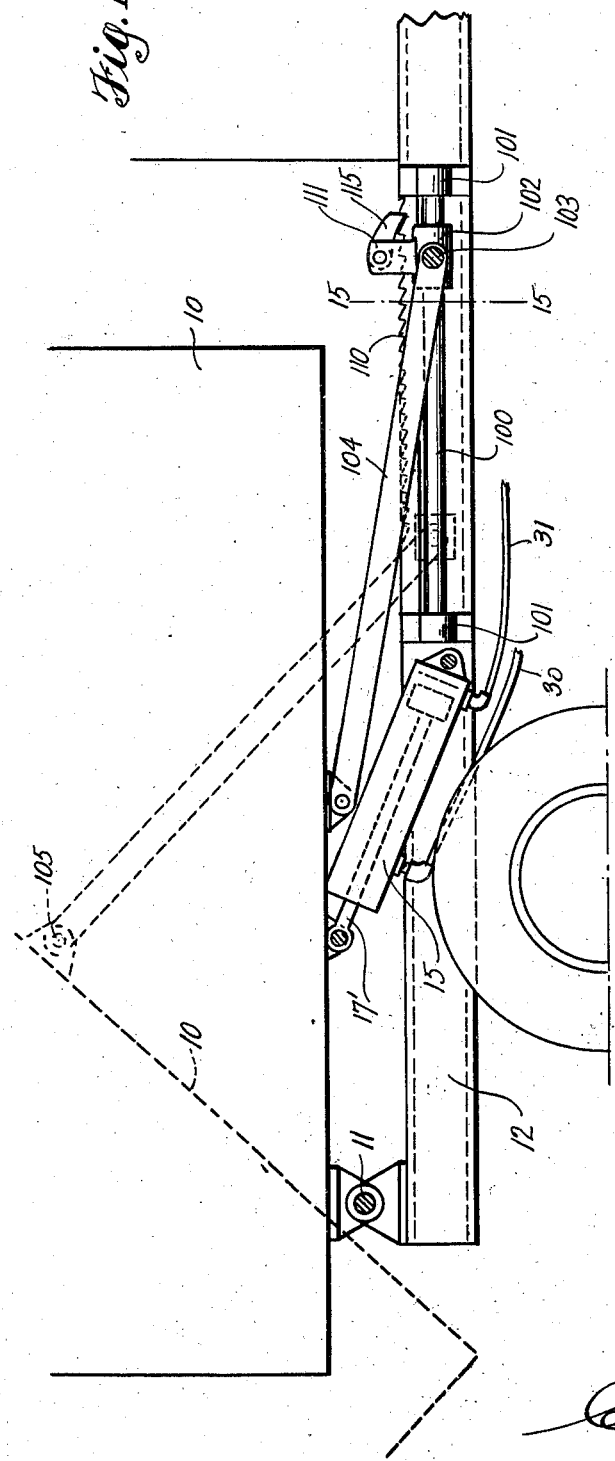
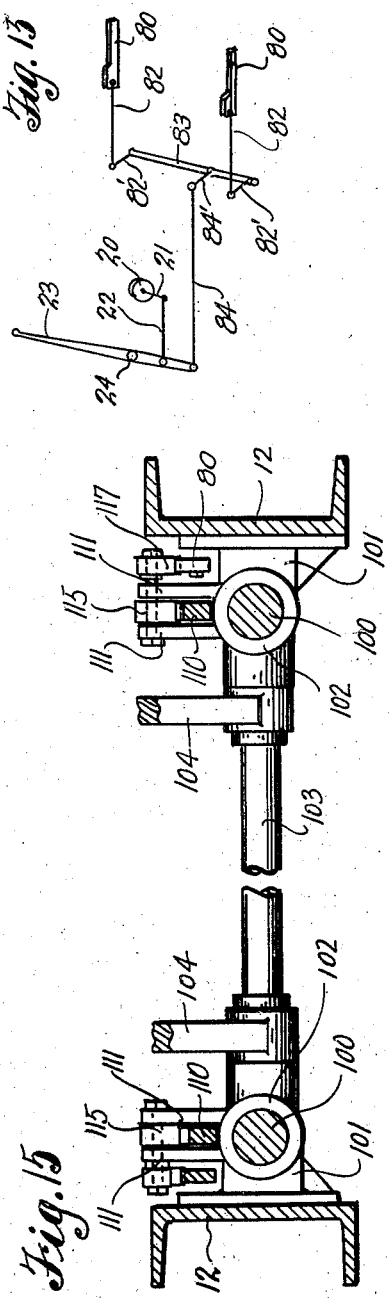
INVENTOR
A.D.L. HUTCHINSON
BY
Cook & Robinson
ATTORNEYS

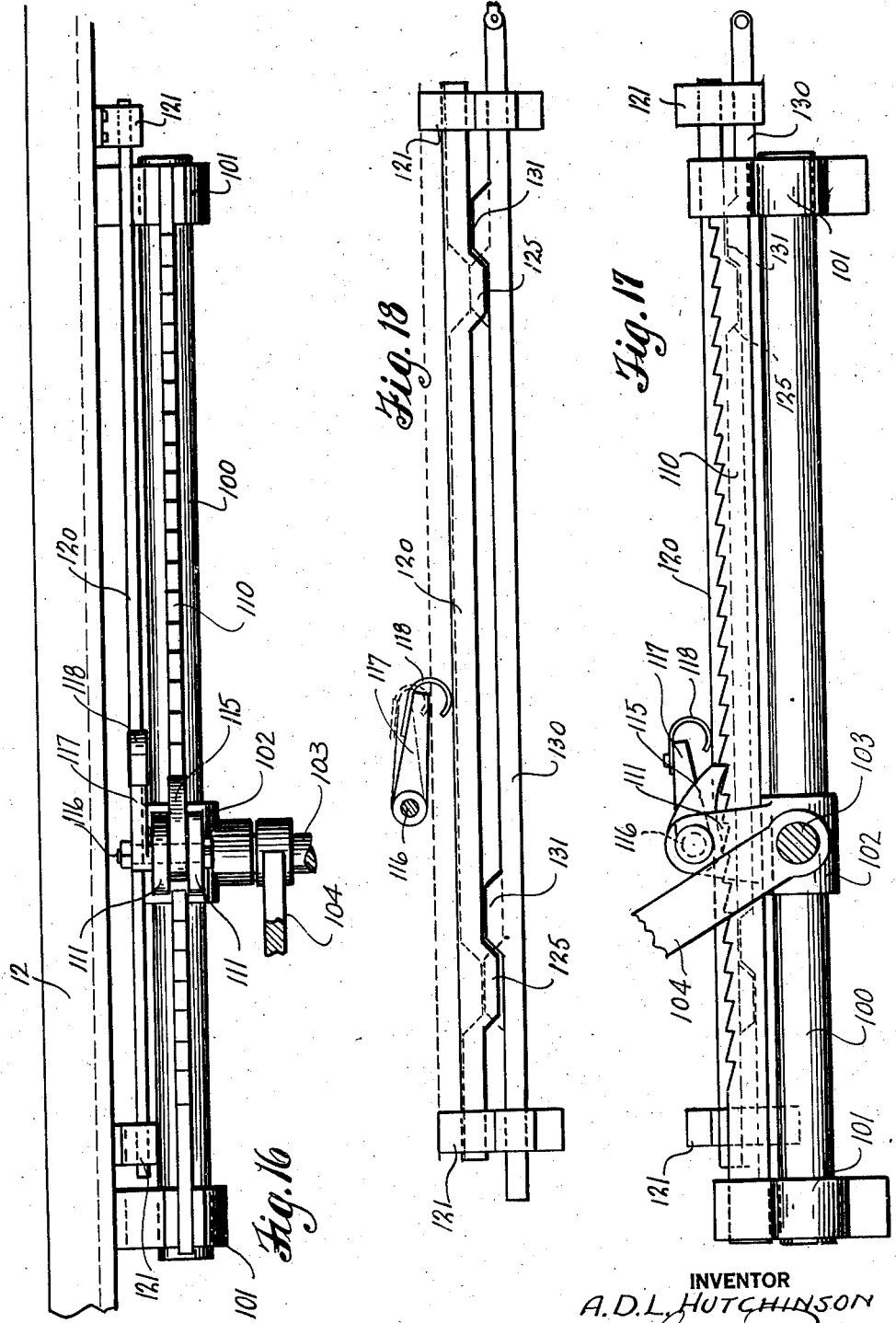

Patented Sept. 3, 1946

2,407,012

UNITED STATES PATENT OFFICE 2,407,012

SAFETY DEVICE FOR DUMP TRUCKS

Archibald D. L. Hutchinson, Seattle, Wash.

Application March 1, 1944, Serial No. 524,551

9 Claims. (Cl. 298—22)

This invention relates to improvements in dump trucks and the like, and it has reference more particularly to safety devices designed for application to dump trucks to prevent any accidental releasing, dropping or lowering of the dump body from any raised position.

Explanatory to the objects of the present invention, it will here be stated that many accidents, injuries and damages have occurred in the use of dump trucks, and the like, as the result of accidental releasing of the dump body from a raised position. Accidental releasing can result from various causes, for example, the breaking of a hydraulic pressure line, or by reason of a pressure line becoming disconnected from the hydraulic jack cylinder, or by reason of an accidental operation of the pressure control valve of the hydraulic power system which lifts and supports the dump body, in a raised position, or from the breaking of some part of the hoisting mechanism, and it is to prevent loss of time, injury, damage and expense from such accidents, regardless of their cause, that the present invention has been devised.

In describing the present invention and its mode of use, I have shown it as applied to an ordinary type of dump truck but this is not to be construed as a limitation to its use, since it is intended that it be applicable to various types of equipment where parts are to be lifted and lowered. The description as applied to dump bodies would apply to any other object ot which the equipment would be applicable.

In view of the foregoing, it has been the principal object of this invention to provide a practical, easily applied and effective safety device that automatically becomes effective for its intended purpose upon the raising of the dump body to any extent from a fully lowered position. Furthermore, it is an object of the invention to so interconnect the releasing devices of the present safety mechanism with the manual control member of the hydraulic system for hoisting and lowering the body that the adjusting of the manual control to a position for lowering the body from any raised position will operate to release the safety device and thus permit the lowering of the body.

More specifically stated, the objects of the present invention are embodied in a safety mechanism including a body supporting linkage, having one end thereof pivotally fixed to the dump body at a location suitably spaced from the hinge axis about which the body dumps, and its other end pivoted in a roller mounted carrier or carriage that is arranged to travel horizontally within guides that are fixed to the vehicle frame and to which carriage a rack bar is attached and is caused to move in an endwise direction in accordance with that travel of the carriage that is caused by the raising or lowering of the body, and there being a stationary pawl arranged to engage the rack or ratchet bar to prevent any accidental dropping of the body from any raised position.

Furthermore, the invention has as an object to provide a releasing means for the pawl that is operatively connected with the control lever of the hydraulic system and whereby, upon moving the lever from a holding position or raising position, to body lowering position, the pawl will be held disengaged from the bar to permit the lowering of the body under control of the hydraulic system.

Other objects of the invention reside in the novel details of construction and combination of parts, and in their mode of operation, as will hereinafter be fully described.

In accomplishing these and other objects of the invention, I have provided the improved details of construction, the preferred forms of which are illustrated in the accompanying drawings, wherein—

Fig. 1 is a side elevation showing parts of the main frame and body of the dump truck as equipped with a safety mechanism that is embodied by the present invention.

Fig. 2 is a horizontal section on the line 2—2 in Fig. 1, showing the arrangement of parts of the present device on the main frame members.

Fig. 3 is an enlarged, cross sectional view of parts of the present mechanism as applied to the frame of the dump truck, and substantially as seen on line 3—3 in Fig. 1.

Fig. 4 is an enlarged, side view of parts of the safety devices, illustrating the ratchet bar and pawl mechanism, the connection of the ratchet bar with the travelling carriage, and the linkage connecting the carriage with the dump body.

Fig. 5 is a cross section on line 5—5 in Fig. 4.

Fig. 6 is a cross section on line 6—6 in Fig. 4.

Fig. 7 is a detail of the pawl actuating means.

Fig. 8 is a diagrammatic illustration of the hydraulic control system and its connection with the control lever and pawl release devices of this mechanism.

Figs. 9, 10 and 11 respectively are views diagrammatically illustrating the hydraulic control valve in its different positions of adjustment to apply the hydraulic pressure medium for raising, holding and lowering the dump body.

Fig. 12 is a detail of the control lever lock.

Fig. 13 is a diagram showing the operating connections between the control lever and the hydraulic control valve and the pawl release slides.

Fig. 14 is a side view of a dump body equipped with a safety mechanism of an alternative form.

Fig. 15 is an enlarged cross section on line 15—15 in Fig. 14.

Fig. 16 is an enlarged, plan view of the slide and ratchet mechanism.

Fig. 17 is a side view of the same.

Fig. 18 is a detail of the pawl release mechanism.

Referring more in detail to the drawings—

In Fig. 1, 10 designates what may be the dump body of a typical dump truck, hingedly supported at its rearward end upon a horizontal cross shaft 11 that is mounted upon the rearward end portion of the main frame of the truck to permit the usual and intended body dumping action. The main frame, insofar as it concerns the present invention, comprises the spaced, longitudinally extending opposite side beams 12—12 of channel form, as best seen in Fig. 3. These beams are joined by suitable cross bracing, not herein shown. When the dump body 10 is in its normal, lowered position, as seen in full lines in Fig. 1, it is supported through the hinge shaft 11, at its rear end, and rests at its forward end upon a cross member 13. The body 10, as so supported, pivots about shaft 11 when it is raised, swinging upwardly toward the full dumping position in which it is shown in dotted lines, and it may be held by its lifting mechanism at any position between its limits of travel.

When the dump body is in its lowered position, as seen in Fig. 1, it is somewhat spaced above the frame beams 12—12 and this provides the necessary clearance between the body and frame for mounting the presently described safety devices.

In the present instance, I have shown the raising and lowering of the dump body 10 to be accomplished by hydraulic means comprising a jack cylinder 15 that is pivoted at one end on a transversely disposed supporting shaft 16 that is fixed at its ends to the frame beams 12 and 12. The jack cylinder contains a piston 17 therein and a rod 17' extends from this piston through the outer end wall of the jack cylinder and has a pivotal connection, indicated at 18, with the bottom of the dump body.

Hydraulic pressure medium is applied to the jack cylinder for holding and for moving the piston through a hydraulic system shown diagrammatically in Fig. 8, including a pump 19 and a four-way control valve 20. The valve has a rotatable plug 20', shown in Figs. 9, 10 and 11, equipped with a lever arm 21 that is connected by a link 22 with a hand control lever 23. The hand lever which is the control lever for the hydraulic system, has a pivot mounting 24 between its upper and lower ends, and the point of connection of link 22 is below pivot 24 as seen in Fig. 8. The lever 23 is adjustable to a forward position, 23a in Fig. 8, which is the position for raising the dump body, to a rearward position 23b which is for lowering the body, and to the intermediate, upright position for holding the body at a set position. The adjustment is such that in moving the lever between body raising and body lowering positions, the valve plug will be rotated approximately 90°.

The arrangement of the control lever and its connection with the valve lever is such that upon moving the hand lever to a forward position, as shown in position 23a, Fig. 8, the valve plug will be rotated to the position shown in Fig. 9 for applying the hydraulic medium to the lower end of the jack cylinder to effect the raising of the dump body. By adjusting the hand lever to its rearward position as shown in dotted lines 23b in Fig. 8, the valve plug will be rotated to the position shown in Fig. 11, thus to allow outflow of pressure medium from the lower end of the jack, thereby lowering the dump body. When the control lever is set at the indicated intermediate position, shown in full lines in Fig. 8, the valve plug will be positioned as in Fig. 10 to trap the pressure medium in the jack and the body will be retained at a set position.

In Fig. 8 I have shown the pump 19 as having a delivery pipe 26 leading to the top part of the four-way valve and having a return pipe 28 leading from a side port of the four-way valve 20.

The hydraulic jack cylinder has a pipe connection 30 from its upper end to the lower opening of the housing 20 opposite the pipe connection 26, and has a pipe connection 31 from its lower end to the side opening of valve housing 20 opposite the pipe connection 28.

A safety device embodied by this invention, shown in Figs. 1 to 12 inclusive, and as used with the dump body and hydraulic system herein illustrated, comprises the following parts:

Located at each of the opposite sides of the main frame of the truck, in transverse alinement, as noted in Fig. 2, are paired, channel beams 50—50, horizontally disposed and placed face to face and slightly spaced apart, as shown in Figs. 3, 5 and 6. Each pair of channel beams 50—50 is supported from the corresponding beam 12 of the main frame by two or more brackets 51 which are bolted to the outside faces of the beams 12. These channel beams 50—50 in an ordinary type of dump truck would be located near the forward, or lifting end of the dump body, but their particular location might be changed as desired or required to meet any special requirement or condition.

Contained between the paired beams 50—50 at each side of the frame, is a carriage comprising a pair of rollers 53—53 mounted on a cross axle 54. These wheels are each retained between the upper and base flanges of the corresponding channel beams 50 for travel therealong, and it is to be understood that the wheels are retained against any vertical movement by the beam flanges, but may travel freely therealong incident to raising or lowering the body.

Disposed horizontally between each of the paired beams 50—50 at each side of the main frame is a ratchet bar 55 that is fixed at one end on the carriage axle 54, and is longitudinally slidable in a guide block 58 that is fixed between the beams 50—50 at one end thereof. A pawl 59 is pivotally supported by a cross shaft 60 to have locking contact with the teeth of the bar 55 to retain it against travel in one direction.

Also pivotally mounted on the cross axle 54 of the carriage is a bracket 65 that extends upwardly between the spaced beams 50—50 and is fixed rigidly to one end of a link 67 of channel form which, at its other end, has a hinged pin connection 69 with a bracket 70 that is fixed to the under side of the bottom of the dump body.

The above described arrangement of parts is such that, with the raising and lowering of the dump body, the wheeled carriage will be caused to travel longitudinally within the guideway formed by the paired beams 50—50 and the ratchet bar 55 will be caused to slide accordingly in an endwise direction, through the guide block 58. With the pawl disengaged from the teeth of the ratchet bar, the body can be raised and lowered under control of the hydraulic medium. With the body raised to any extent, and the pawl engaged with the ratchet, the body cannot be lowered either by the hydraulic means or accidentally.

A feature of this invention resides in the provision of means for automatically engaging the pawl with the ratchet bar in the holding and raising positions of the control lever to insure against accidental lowering or dropping of the body, and to automatically disengage the pawl from the ratchet upon moving the control lever to body lowering position.

It is to be understood that the pawl 59 has rotative movement on its mounting shaft 60 to a limited extent, as provided for in a yielding connection, which is shown in Fig. 7. This connection comprises a short length of relatively stiff spring wire 75 that has one end fixed in the mounting shaft close to the pawl, and has its other end portion extended along the pawl and turned inwardly and passed through a hole 76 therein. This spring wire has sufficient stiffness to cause the pawl to be actuated by rotative movement of the mounting shaft.

At its inner end, the pawl mounting shaft has a lever arm 78 with a roller 79 at its end that rests upon a horizontal slide bar 80 mounted for endwise travel in a guide bracket 81 fixed to the adjacent beam 50. Links 82 connect the forward ends of slides 80 with arms 82' fixed on a cross shaft 83, as in Fig. 13, and on which cross shaft is a lever arm 84 connected by a link 84' with lever 23 so that the adjustment of the slide is coincident with adjustment of the hydraulic control valve 20.

Formed in the top of each slide bar is a depression 85 in which the roller 79 will engage when the slide 80 is in "holding" or "raising" positions as set by the lever 23. Movement of the slides 80 resultant to shifting the control lever 23 to lowering position, will cause the rollers 79 to ride out of the depressions 85, thus to rotate the shafts 60 and lift the pawls clear of the ratchet bars and permit the lowering of the body. Thus, the "disengaged" and "engaged" positions of the pawls are in accordance with the setting of the valve 20 for lowering of the body and for locking it in a raised position.

As an additional safety measure to prevent accidental shifting of lever 23 to lower the body and thus disengage the pawls, the upper end portion of the lever 23 is caused to bear yieldingly against and to move along a segment bar 90, see Figs. 7 and 12, formed with a centrally located outset portion 90' forming a shoulder 91. When the control lever is in holding or in raising position, it is located at one side of the shoulder and cannot be accidentally moved to lowering position. However, by pressing the lever laterally, it will yield and can be disengaged from the shoulder and can be moved to lowering position.

In the device shown in Figs. 14 to 18, a pair of parallel guide shafts 100—100 are supported by brackets 101 to extend horizontally along the inside of the vehicle frame beams 12—12. Slidable along each shaft is a bearing 102 and the two bearings are joined by a cross shaft 103. Pivoted on the cross shaft 103 are the lower ends of paired links 104—104 which at their upper ends, are pivoted to the under side of the dump body, as seen at 105 in Fig. 14. The dump body 10, in this case, is pivotally supported at its rear end by the cross shaft 11 and is adapted to be raised and lowered by the hydraulic jack 15, in the same manner as has already been described in connection with the device of Figs. 1 to 12.

Supported parallel with the guide shafts 100—100 by the same brackets 101 that mount the shafts, are ratchet bars 110, and as noted in Fig. 15, these ratchet bars pass between paired, spaced flanges 111—111 on the top side of the bearings. The flanges of each bearing mount a pawl 115 between them to engage with the teeth of the ratchet bars in a manner to support the dump body when in any raised position. Each pawl is fixed to a pivot shaft 116 which at its outer end is equipped with a lift lever 117, as seen in Figs. 16 and 17. The lever has a bowed spring 118 and at its end engaged with the straight top edge of a bar 120. The bars 120, as seen in Fig. 18, are retained in guides 121 for slight vertical movement.

Each bar 120 has cam surfaces 125 on its under edge that engage the top edge of slide bars 130 which correspond to the slide bars 80 of the device of Fig. 7, and these are formed with cam surfaces 131 that effect the lifting of bars 120 when the lever 23 is moved to lowering position, thus to disengage the pawls from the ratchets.

While I have shown the present safety device as applied to a dump truck having a hydraulic operating system, it is not intended nor is it desired that the invention be restricted either to auto dump trucks or to dump devices having hydraulic control, but that it be applied to any and various elevated devices operating on the same principle, and under mechanical control.

Having thus described my invention, what I claim as new therein and desire to secure by Letters Patent is—

1. In combination, a supporting frame structure, a dump body mounted on the frame structure, powered mechanism for effecting the raising, lowering and holding of the body in a raised position, a manually movable member for controlling the operation of the powered mechanism and movable to different positions to effect the raising, lowering or holding of the body, and a safety supporting mechanism for the body, comprising a ratchet bar and pawl, means causing their relative movement upon raising and lowering the body, a device normally holding the pawl disengaged from the ratchet having operative connection with the said manually movable member for releasing the pawl incident to the positioning of the said manually movable member in position to effect the body lowering operation by the powered mechanism.

2. In combination, a supporting frame structure, a dump body mounted on the said frame structure, a power device for effecting the raising and lowering movements of the body, a control member for the said power device movable to different positions for causing it to effect the raising, lowering and holding of the body, and a safety device for support of the body including a ratchet bar, having a connection with the body whereby it is caused to move endwise in accordance with the raising and lowering action of the body, a pawl for engaging the ratchet to hold the body against lowering, and means operable by the movement of the said control member to determine the position of the pawl.

3. In combination, a frame structure, a body mounted thereon, power mechanism for raising, holding and lowering the body, and a safety mechanism for the support of the body when in any raised position; said safety mechanism comprising a guideway fixed to the frame structure, a brace bar connected at one end to the body to move up and down therewith, and having a holding connection at its other end with the said guideway for travel therealong in accordance with raising and lowering action of the body, a ratchet bar, guides for the bar, means connecting the ratchet bar with the said holding connection of the brace bar to cause the ratchet bar to move endwise in accordance with the raising and lowering of the body, a pawl mounted to engage the ratchet to prevent lowering of the body, and means for controlling the action of the pawl.

4. In combination, a frame structure, a body mounted thereon, power mechanism for raising, holding and lowering the body, and a safety mechanism for the support of the body when in any raised position; said safety mechanism comprising a guideway fixed to the frame structure, a brace bar connected at one end to the body to move up and down therewith, and having a holding connection at its other end with the said guideway for travel therealong in accordance with raising and lowering action of the body, a ratchet bar, guides for the bar, means connecting the ratchet bar with the said holding connection of the brace bar to cause the ratchet bar to move endwise in accordance with the raising and lowering of the body, a pivoted pawl mounted to engage the ratchet to prevent lowering of the body, a slide movable to different positions to effect the raising of the pawl free of the ratchet or to permit its being lowered to holding position, a control member for the said power mechanism movable to different positions for causing raising, holding and lowering of the body, and means connecting said control member with the slide whereby the pawl is caused to be held disengaged when the control member is in holding position.

5. In a dump truck having a main frame, a body that is pivoted on the frame for dumping action, a hydraulic jack for controlling the raising and lowering actions of the body, a hydraulic system for the jack, and a control valve in the system, a control lever for said valve movable to different positions for effecting raising, lowering or holding of the body, a safety mechanism for support of the body when raised comprising a guideway fixed horizontally to the main frame, a brace bar having an end pivotally attached to the body and having a carrier mounted at its other end that is movable along the guideway in accordance with the raising and lowering of the body, a ratchet bar mounted in the guideway and fixed to the carrier and movable endwise with the raising and lowering of the body, a pawl mounted for engagement with the ratchet bar to prevent lowering of the body, pawl control slides, and linkage connecting the said slides with the control lever whereby the placing of the lever in body lowering position will disengage the pawls from the ratchets.

6. A safety mechanism as recited in claim 5 wherein the pawl is equipped with a mounting shaft and a control lever arm for the shaft, and wherein the said control slide has a cam surface to actuate the lever arm to raise or lower the pawl for contact with the ratchet.

7. In a dump truck having a main frame, a dump body mounted thereon, a hydraulic jack for controlling the action of the body, a pump for a hydraulic pressure medium, a two-way valve comprising a housing having pipe connections with opposite sides of the pump, and pipe connections with opposite ends of the jack and a valve in the housing adjustable to different positions for the application of pressure medium to the jack and a lever movable to different positions to adjust the valve to cause raising or lowering of the body, or for holding it in a raised position, a safety device for preventing uncontrolled lowering of the body, comprising guide members fixed horizontally to the main frame, bearings movable along the guide members, brace links with ends pivotally fixed to the bearings, and their other ends fixed to the body, ratchet bars fixed parallel to the guide members, pawls mounted by the bearings to engage the ratchet bars to support the body when raised and devices operable by the control lever, to disengage the pawls from the ratchets when the lever is in body lowering position.

8. In combination, a supporting frame, a dump body mounted thereon, a powered device for controlling movements of the dump body and a safety device for supporting the body against uncontrolled lowering comprising a ratchet bar, and a body holding pawl engageable with the bar, a manually movable control member for the powered device movable to different positions for the raising, controlled lowering and holding of the body in raised position, means operatively connecting said control member with the pawl to disengage it from the ratchet for controlled lowering of the body, and a safety stop for the said control member to prevent its accidental shifting to body lowering position.

9. In combination, a supporting frame, a dump body mounted thereon, a powered device for controlling movements of the dump body and a safety device for supporting the body against uncontrolled lowering, comprising a ratchet bar, and a body holding pawl engageable with the bar, a manually movable control lever for the powered device, an operative connection between the lever and pawl to release the latter for lowering the body upon shifting the lever to body lowering position, and a safety stop member associated with the lever to be engaged thereby to prevent movement of the lever to body lowering position and said lever being resilient to permit its disengagement from the safety stop.

ARCHIBALD D. L. HUTCHINSON.